US012617689B2

(12) United States Patent
Liu et al.

(10) Patent No.: US 12,617,689 B2
(45) Date of Patent: May 5, 2026

(54) SEPARATION AND RECOVERY METHOD FOR BORON TRIFLUORIDE AND COMPLEX THEREOF IN OLEFIN POLYMERIZATION REACTION

(71) Applicant: PETROCHINA COMPANY LIMITED, Beijing (CN)

(72) Inventors: Tong Liu, Beijing (CN); Yuanyuan Cao, Beijing (CN); Yulong Wang, Beijing (CN); Libo Wang, Beijing (CN); Xianming Xu, Beijing (CN); Hongping Li, Beijing (CN); Enhao Sun, Beijing (CN); Xiuhui Wang, Beijing (CN); Wei Sun, Beijing (CN); Han Gao, Beijing (CN); Hongling Chu, Beijing (CN); Yongjun Zhang, Beijing (CN); Yonggang Ji, Beijing (CN); Kecun Ma, Beijing (CN); Yan Jiang, Beijing (CN); Qian Chen, Beijing (CN); Hongliang Huo, Beijing (CN); Qi Yu, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 548 days.

(21) Appl. No.: 18/039,469

(22) PCT Filed: Oct. 27, 2021

(86) PCT No.: PCT/CN2021/126622
§ 371 (c)(1),
(2) Date: May 30, 2023

(87) PCT Pub. No.: WO2022/116746
PCT Pub. Date: Jun. 9, 2022

(65) Prior Publication Data
US 2024/0002243 A1     Jan. 4, 2024

(30) Foreign Application Priority Data

Dec. 4, 2020    (CN) .......................... 202011399463.1

(51) Int. Cl.
| | |
|---|---|
| *B01D 15/00* | (2006.01) |
| *B01D 3/06* | (2006.01) |
| *B01D 53/22* | (2006.01) |
| *B01D 71/34* | (2006.01) |
| *B01D 71/36* | (2006.01) |
| *C01B 35/06* | (2006.01) |

(52) U.S. Cl.
CPC .............. *C01B 35/061* (2013.01); *B01D 3/06* (2013.01); *B01D 53/228* (2013.01); *B01D 71/34* (2013.01); *B01D 71/36* (2013.01); *B01D 2311/10* (2013.01); *B01D 2311/14* (2013.01); *C01B 2210/0012* (2013.01)

(58) Field of Classification Search
None
See application file for complete search history.

(56) References Cited

U.S. PATENT DOCUMENTS

| | | | |
|---|---|---|---|
| 4,308,414 | A | 12/1981 | Madgavkar et al. |
| 4,433,197 | A | 2/1984 | Vogel |
| 4,956,513 | A | 9/1990 | Walker et al. |
| 5,371,052 | A | 12/1994 | Kawamura et al. |
| 5,846,429 | A | 12/1998 | Shimizu et al. |
| 6,075,174 | A | 6/2000 | Presedo |
| 6,084,144 | A | 7/2000 | Takashima et al. |
| 6,407,186 | B1 | 6/2002 | Rath et al. |

(Continued)

FOREIGN PATENT DOCUMENTS

| | | |
|---|---|---|
| CN | 1289344 A | 3/2001 |
| CN | 101734681 A | 6/2010 |

(Continued)

OTHER PUBLICATIONS

English Translation of International Search Report and Written Opinion in Application No. PCT/CN2021/126622, mailed Jan. 29, 2022, 4 pages.
English Translation of Search Report in Chinese Application No. 202011399463.1, 9 pages.
Zhang, Weijiang, et al., "Separation and recovery of BF3 complexes in PAO preparation process", Chemical Industry and Engineering Progress.
Office Action and Search Report issued on Nov. 21, 2023, in Chinese Patent Application No. 202011399463.1.

(Continued)

*Primary Examiner* — Yun Qian
(74) *Attorney, Agent, or Firm* — Meunier Carlin & Curfman LLC

(57)     ABSTRACT

The present invention provides a method for separation and recovery of boron trifluoride and complexes thereof in an olefin polymerization reaction. The method for separation and recovery of boron trifluoride and complexes thereof in an olefin polymerization reaction, comprising: 1) subjecting a mixture obtained after an olefin polymerization reaction to flash distillation separation to separate part of gaseous boron trifluoride; 2) subjecting the liquid phase obtained from the flash distillation separation to membrane separation to obtain complexes of boron trifluoride and a crude product of the olefin polymerization reaction; and 3) subjecting the crude product of the olefin polymerization reaction obtained in step 2) to gas stripping separation to separate the remaining gaseous boron trifluoride, so as to obtain a pure product of the olefin polymerization reaction The present invention designs a matching process based on the polymorphic characteristics of boron trifluoride and complexes thereof to achieve efficient separation of boron trifluoride and complexes thereof from polymerization intermediates.

11 Claims, No Drawings

(56) References Cited

U.S. PATENT DOCUMENTS

| | | | |
|---|---|---|---|
| 2004/0030076 A1 | 2/2004 | Wettling et al. | |
| 2006/0178545 A1 | 8/2006 | Yang et al. | |
| 2007/0287812 A1 | 12/2007 | McDermott et al. | |
| 2015/0133691 A1 | 5/2015 | Oda et al. | |
| 2020/0190409 A1* | 6/2020 | Chu ........................ | C10G 50/02 |

FOREIGN PATENT DOCUMENTS

| | | | |
|---|---|---|---|
| CN | 106800299 A | 6/2017 |
| CN | 108251155 A | 7/2018 |
| EP | 1557221 A1 | 7/2005 |
| EP | 2821137 A1 | 1/2015 |
| JP | 10296004 A | 11/1998 |
| JP | 10298114 A | 11/1998 |
| JP | 2000109313 A | 4/2000 |
| JP | 2000128522 A | 5/2000 |
| JP | 2000135402 A | 5/2000 |
| JP | 2000135403 A | 5/2000 |
| RU | 2702232 C2 | 10/2019 |
| WO | 2002040553 A1 | 5/2002 |

OTHER PUBLICATIONS

Office Action issued on Nov. 21, 2023, in Chinese Patent Application No. 2023112102456120.

Grant-Decision issued on Nov. 3, 2023, in Russian Patent Application No. 2023104193.

First Office Action issued on Dec. 25, 2023 for counterpart Saudi Arabian patent application No. 523440198, along with the English translation.

* cited by examiner

SEPARATION AND RECOVERY METHOD FOR BORON TRIFLUORIDE AND COMPLEX THEREOF IN OLEFIN POLYMERIZATION REACTION

TECHNICAL FIELD

The present invention relates to the field of olefin polymerization, and specifically to a method for separating and recovering boron trifluoride and complexes thereof in an olefin polymerization reaction.

BACKGROUND

Boron trifluoride is a typical representative of Lewis acid catalysts, and the boron trifluoride complexes formed from it and an initiator are widely used as catalysts in various reactions such as olefin polymerization, oligomerization, alkylation and isomerization, with characteristics of high selectivity and catalytic activity, high product yield and narrow relative molecular mass distribution. However, boron trifluoride is highly corrosive, which tends to cause corrosion to equipments and reduce product quality. Therefore, when the reaction is finished, boron trifluoride and its complex need to be separated from the polymerization reaction system. The separation of boron trifluoride and its complex is usually carried out by neutralizing the reaction intermediate with an aqueous solution of alkaline such as ammonia, sodium hydroxide or lime, and then washing the reaction intermediate with water to neutral.

However, in the above method, wastewater containing high concentration of boron trifluoride hydrate or neutralized boron trifluoride is discharged, which can bring serious issues of environmental pollution. Since it is difficult to remove the boron element in a simple and convenient manner by using the current drainage treatment technology, complete removal of the boron element is very costly. Moreover, due to the high price of boron trifluoride, researchers intend to recycle and reuse the removed boron trifluoride or boron trifluoride complex. Thus, there is a need to seek for a simple and easy industrial method to directly separate boron trifluoride and its complex from reaction intermediate products and recover them for recycling, allowing a fundamental change of the recycling process and substantial reduction of the production cost, and avoiding the generation of a large amount of waste water and waste alkali, which is of a great significance for environmental protection.

A number of methods for the separation and recovery of boron trifluoride have been previously reported and disclosed. For example, a fluid of a reaction intermediate product containing boron trifluoride or boron trifluoride complex is contacted with calcium fluoride (CaF$_2$) at a temperature of 200° C. or below and the resulting calcium tetrafluoroborate (Ca(BF$_4$)$_2$) is heated at a temperature of 100-600° C. to obtain boron trifluoride and calcium fluoride, so as to recover boron trifluoride. As another example, fluorides such as lithium fluoride and barium fluoride are contacted with a fluid of a reaction intermediate product containing boron trifluoride or boron trifluoride complex to generate tetrafluoroborate, which is heated at a temperature of 100-600° C., so as to recover boron trifluoride. Further, a common method used in industry to separate boron trifluoride complexes is a cracking process.

However, in a reaction where boron trifluoride or boron trifluoride complex is used as a catalyst, in many cases the reaction needs to be carried out at a temperature at or below room temperature. After the reaction is completed, if the temperature rises to 100° C. or above, there may be the following adverse effects: (1) a high temperature favors side reactions such as the generation of tetrafluoroboric acid, causing a decrease in the yield or quality of the target reaction product; (2) a heating decomposition reaction at a high temperature is not preferable in terms of energy conservation; (3) when the fluid of the reaction intermediate product containing boron trifluoride or boron trifluoride complex is viscous, its separation from borates such as calcium tetrafluoroborate becomes more difficult.

There is also a technology in which the reaction intermediate product is contacted with silica. Due to the much stronger adsorption on silica of boron trifluoride than that of a complexing agent, boron trifluoride in the intermediate product of the reaction is removed by adsorption, and then recovered for reuse upon desorption under heating. The advantage is that no new impurity is introduced during the separation process and the operation is simple. However, functional groups such as siloxane and silanol groups present within the silica molecules tend to decompose boron trifluoride during the removal of boron trifluoride, resulting in lower separation and recovery efficiency, and thus it is not suitable for large-scale separation.

Both the method of removing boron trifluoride from oligomer reaction products by extraction with water and the method of separating boron trifluoride catalyst dispersed in the intermediate products of polymerization reaction with an electrostatic agglomerator are simple and easy to operate, with good separation results. However, the former consumes a large amount of extractant and requires the separation and regeneration of the extractant; whereas the latter requires a large amount of electricity and is also not suitable to large-scale separation.

The common disadvantage of the above methods is that they are not suitable for large-scale separation and difficult to be industrialized. Further, the traditional absorption method has been gradually abandoned due to its complicated operation and tendency to produce large amounts of wastewater containing boron and fluorine.

Although extensive investigation has been done by numerous researchers on the separation and recovery of boron trifluoride and its complexes, and many methods have been proposed to separate and recover boron trifluoride and its complexes, there are still many problems such as complicated operation, high energy consumption, occurrence of side reactions, large amount of waste liquid discharge and unfavorable to large-scale production.

Therefore, it is particularly important to find a method that is capable of separating and recovering boron trifluoride and its complexes at low cost and high efficiency, which is suitable for mass production and meets the requirements of eco-friendly development of the society.

SUMMARY OF THE INVENTION

The object of present invention is to provide a method for separation and recovery of boron trifluoride and complexes thereof in an olefin polymerization reaction.

In order to achieve the above object, the present invention adopts the following technical solutions.

The present invention provides a method for separation and recovery of boron trifluoride and complexes thereof in an olefin polymerization reaction, comprising:

1) subjecting a mixture obtained after an olefin polymerization reaction to flash distillation separation to separate part of gaseous boron trifluoride;

2) subjecting the liquid phase obtained from the flash distillation separation to membrane separation to obtain complexes of boron trifluoride and a crude product of the olefin polymerization reaction; and 3) subjecting the crude product of the olefin polymerization reaction obtained in step 2) to gas stripping separation to separate the remaining gaseous boron trifluoride, so as to obtain a pure product of olefin polymerization reaction.

Based on the separation and recovery method of the present invention, preferably, in step 2), an organic membrane of fluorine-containing polymer is used in the membrane separation. Further preferably, the organic membrane of fluorine-containing polymer can be selected from any one of an organic membrane of polyvinylidene fluoride or polytetrafluoroethylene. This material is unlikely to be corroded by oxidation due to the characteristics of fluorine atoms and has a strong separating effect on complexes in various complexation states at room temperature. Therefore, the membrane separation of the present invention can effectively separate boron trifluoride complexes by using the organic membrane of fluorine-containing polymer.

Based on the separation and recovery method of the present invention, preferably, the membrane separation is carried out at a separation pressure of 0.1 to 1 MPa and a separation temperature of 5 to 50° C.

Based on the separation and recovery method of the present invention, preferably, the separation and recovery method further comprises: passing the gaseous boron trifluoride separated in step 1) through a gas booster to pressurize it to a desired pressure for recovery and reuse.

More preferably, the gaseous boron trifluoride is subjected to a purification treatment prior to pressurization, wherein the purification treatment comprises cooling the gas down to 0 to 30° C., so as to achieve gas-liquid separation to purify the gaseous boron trifluoride.

Based on the separation and recovery method of the present invention, preferably, the separation and recovery method further comprises: further subjecting the boron trifluoride complexes separated in step 2) to a solvent extraction before recovery and reuse.

Here, the solvent extraction is used in order to separate the trivial amount of olefin polymers remaining in the boron trifluoride complexes isolated in step 2), and a solvent extraction process is used as the purification method. The extractant used is completely immiscible with the complexes and completely miscible with the olefin polymers, and is a saturated hydrocarbon with a carbon number of 10 to 18 having an electron-donating group, and the volume ratio of the extractant to the boron trifluoride complexes is 1:1 to 10:1. For example, the extractant may be 2-methylundecane, 2-methyldecane, dodecane, etc., as in the examples below.

Based on the separation and recovery method of the present invention, preferably, the separation and recovery method further comprises: subjecting the gaseous boron trifluoride separated in step 3) for complexation and absorption by a complexing agent before reuse.

More preferably, the complexing agent is water or an alcohol-based complexing agent (for example, isopropanol, etc.), and the complexation and absorption is carried out at a temperature of −10° C. to 30° C.

Based on the separation and recovery method of the present invention, preferably, the flash distillation separation is carried out at a flash distillation pressure of 1 to 101 kPa, a flash distillation temperature of 5 to 120° C. for a flash distillation duration of 1 to 60 min.

Based on the separation and recovery method of the present invention, preferably, the gas stripping separation is carried out at a gas stripping temperature of 5 to 120° C. for a duration of 10 to 60 min, a volume ratio of the gas used for gas stripping to the crude product of the olefin polymerization reaction is 1:1 to 50:1, and a gas stripping medium is one or a combination of two or more of nitrogen, helium, argon, krypton and xenon.

The olefin polymerization reaction referred to in the present invention comprises dimerization, oligomerization, condensation and polymerization of olefins. In addition, all of the solvents used in the separation and recovery method of the present invention can be separated by distillation and recovered for reuse.

During the research and development of the present invention, the multiple complexation states of a $BF_3$ complex have been fully acknowledged. After flash evaporation, a part of the gaseous $BF_3$ is separated, but most of the liquid complexes remains in the reaction system. Due to the diversity of the morphology of the complexes, the general liquid-liquid separation process has inadequate specificity and poor removal efficacy. In the present invention, with a further membrane separation process and the use of an organic membrane of a special fluoropolymer, the majority of the liquid complexes can be effectively removed. In addition, it has been discovered during the development of the present invention that a part of gaseous $BF_3$ remains in the system after membrane separation and create an equilibrium with the oil product, which adds on the difficulty of subsequent separation. The hydrogenation catalyst and hydrogenation equipment used subsequently have extremely strict requirement for the fluorine (F) content. Noble metal catalysts are generally used in a hydrogenation process, and a high F content will lead to catalyst poisoning and inability of functioning in hydrogenation. In addition, a high F content will cause pitting corrosion in the equipment under hydrogenation conditions. Thus, there is a great need to strictly control the F content and achieve effective removal of the catalyst. Therefore, the present invention performs a further gas separation of the crude product of olefin polymerization reaction after membrane separation to further remove the remaining gaseous boron trifluoride, so as to control the F content of the olefin polymerization reaction product.

In the present invention, an adaptive process is designed in accordance with the polymorphic characteristics of boron trifluoride and its complexes, to achieve efficient separation of boron trifluoride and its complexes in polymerization intermediates. With the separation and recovery method of the present invention, boron trifluoride and its complexes in different phases can be separated step by step in a combinational process. The separation and recovery method based on the present invention has been verified by testing in a 100-ton pilot test of a low-viscosity poly α-olefin synthetic oil (PAO), resulting in an unexpected separation and recovery rate of boron trifluoride and its complexes of more than 99%, which solved the difficult issues of eco-friendly decomposition of catalysts and efficient recycling of the active components.

Compared with the prior art, the present invention are mainly advantageous in the following aspects:

1) In the combinational process of the present invention, the separation of gaseous boron trifluoride from the polymerization intermediate product is first done by a gas-liquid flash distillation separation process at a low pressure and room temperature, without disrupting the structure of the boron trifluoride complexes and triggering side reactions; then, liquid complexes are separated by a liquid-liquid membrane separation process at room temperature; finally, the residual gaseous boron trifluoride is separated by a gas separation process, with a fluorine content in the polymerization intermediate product upon separation of less than 10 ppm.

2) The method for separation and recovery of boron trifluoride and its complexes according to the present invention is highly flexible, simple to operate, has low energy consumption and improved process economics, with no generation of the three wastes throughout the process, and is an energy-saving, eco-friendly and highly efficient recycling process.

DETAILED DESCRIPTION OF THE INVENTION

In order to better illustrate the present invention, the invention is further described below in connection with preferred examples. It should be understood by those skilled in the art that the following specific description is illustrative and not limiting, and is not intended to limit the protection scope of the present invention.

All numerical indications in the present invention (e.g., temperature, time, concentration, weight, and the like, including the range of each of these) may generally be approximated by varying, (+) or (−), in an appropriate increment of 0.1 or 1.0. All numerical indications are understood to be represented as they are preceded by the term "approximately".

Example 1

In this example, separation and recovery of boron trifluoride and its complexes in an olefin polymerization reaction were carried out, which specifically comprises the following steps.

Polymerization Reaction:

1-octene was used as a raw material, and the catalyst was a complex of $BF_3$ and isopropanol as a complexing agent. The amount of catalyst used was 4 wt %. The raw material 1-octene and the catalyst were placed in a reaction kettle and mixed with stirring, followed by the introduction of gaseous $BF_3$ to conduct a reaction at constantly 0.5 MPa, where the reaction temperature was 40° C. and the reaction duration was 3 h.

Separation and recovery of boron trifluoride and its complex:

After the polymerization reaction was completed, the polymerization intermediate product containing boron trifluoride and its complex was pumped into a flash distillation tank and flash distilled for 1 min at a flash distillation pressure of 1 kPa and a flash distillation temperature of 120° C. The dissolved $BF_3$ gas in the polymerization intermediate product was removed, and this portion of gaseous $BF_3$ was pressurized by a compressor and recycled to the reaction system for reuse.

The intermediate product after flash distillation then entered a membrane separation device at a rate of 0.01 m³/h for the separation of the complex catalyst, at a separation pressure of 1 MPa and a separation temperature of 50° C. The material used for membrane separation was a polyvinylidene fluoride membrane. The output of the membrane separation device was the intermediate product from which the complex catalyst was removed, and the bottom output was the separated complex catalyst. The extraction was carried out by using 2-methylundecane as an extractant at a volume ratio of 1:1, and the purified complex upon further separation could be reused.

The intermediate product from which the complex catalyst was removed was subjected to separation by gas stripping for 10 min at a gas stripping temperature of 120° C. and a volume ratio of 50:1 of the gas (inert gas such as nitrogen) to the intermediate product for gas stripping, so as to further remove the remaining gaseous $BF_3$ dissolved in the polymerization intermediate product. The $BF_3$ separated by gas stripping was absorbed with water at a complexation temperature of 25° C. After the gas stripping separation, a final polymerization product was obtained, with a fluorine content measured to be less than 10 ppm, and a rate of separation and recovery of boron trifluoride and its complex of more than 99%. The recovery is calculated as follows: recovery (%)=$(F_1-F_2)/F_1$, where $F_1$ is the fluorine content in boron trifluoride and its complex in the olefin polymerization reaction, and $F_2$ is the fluorine content in the product of the olefin polymerization reaction, and the same applies in the following examples.

Example 2

In this example, separation and recovery of boron trifluoride and its complexes in an olefin polymerization reaction were carried out, which specifically comprises the following steps.

The procedure of the polymerization reaction was the same as that in Example 1. After the polymerization reaction was completed, the polymerization intermediate product containing boron trifluoride and its complex was pumped into a flash distillation tank and flash distilled for 60 min at a flash distillation pressure of 50 kPa and a flash distillation temperature of 5° C. The dissolved $BF_3$ gas in the polymerization intermediate product was removed, and this portion of gaseous $BF_3$ was pressurized by a compressor and recycled to the reaction system for reuse.

The intermediate product after flash distillation then entered a membrane separation device at a rate of 5 m³/h for the separation of the complex catalyst, at a separation pressure of 0.1 MPa and a separation temperature of 5° C. The material used for membrane separation was a polyvinylidene fluoride membrane. The output of the membrane separation device was the intermediate product from which the complex catalyst was removed, and the bottom output was the separated complex catalyst. The extraction was carried out by using 2-methylundecane as an extractant at a volume ratio of 5:1, and the purified complex upon further separation could be reused.

The polymerization intermediate product from which the complex catalyst was removed was subjected to separation by gas stripping for 60 min at a gas stripping temperature of 5° C. and a volume ratio of 1:1 of the gas (inert gas such as nitrogen) to the intermediate product for gas stripping, so as to further remove the remaining gaseous $BF_3$ dissolved in the polymerization intermediate product. The $BF_3$ separated by gas stripping was absorbed with isopropanol as complexing agent at a complexation temperature of 30° C. After the gas stripping separation, a final polymerization product was obtained, with a fluorine content measured to be less than 10 ppm, and a rate of separation and recovery of boron trifluoride and its complex of more than 99%.

Example 3

In this example, separation and recovery of boron trifluoride and its complexes in an olefin polymerization reaction were carried out, which specifically comprises the following steps.

The procedure of the polymerization reaction was the same as that in Example 1.

Separation and recovery of boron trifluoride and complex thereof:

After the polymerization reaction was completed, the polymerization intermediate product containing boron trifluoride and its complex was pumped into a flash distillation tank and flash distilled for 30 min at a flash distillation pressure of 101 kPa and a flash distillation temperature of 60° C. The dissolved $BF_3$ gas in the polymerization intermediate product was removed, and this portion of gaseous $BF_3$ was pressurized by a compressor and recycled to the reaction system for reuse.

The intermediate product after flash distillation then entered a membrane separation device at a rate of 2.5 m³/h for the separation of the complex catalyst, at a membrane separation pressure of 0.5 MPa and a separation temperature of 25° C. The material used for membrane separation was a polytetrafluoroethylene membrane. The output of the membrane separation device was the intermediate product from which the complex catalyst was removed, and the bottom output was the separated complex catalyst. The extraction was carried out by using 2-methylundecane as an extractant at a volume ratio of 10:1, and the purified complex upon further separation could be reused.

The polymerization intermediate product from which the complex catalyst was removed was subjected to separation by gas stripping for 30 min at a gas stripping temperature of 80° C. and a volume ratio of 10:1 of the gas (inert gas such as nitrogen) to the intermediate product for gas stripping, so as to further remove the remaining gaseous $BF_3$ dissolved in the polymerization intermediate product. The $BF_3$ separated by gas stripping was absorbed with isopropanol at a complexation temperature of −10° C. After the gas stripping separation, a final product was obtained, with a fluorine content measured to be less than 10 ppm, and a rate of separation and recovery of boron trifluoride and its complex of more than 99%.

Example 4

In this example, separation and recovery of boron trifluoride and its complexes in an olefin polymerization reaction were carried out, which specifically comprises the following steps.

The procedure of the polymerization reaction was the same as that in Example 1.

Separation and recovery of boron trifluoride and complex thereof:

After the polymerization reaction was completed, the polymerization intermediate product containing boron trifluoride and its complex was pumped into a flash distillation tank and flash distilled at a flash distillation pressure of 20 kPa and a flash distillation temperature of 100° C. to remove the dissolved $BF_3$ gas in the polymerization intermediate product, and this portion of gaseous $BF_3$ was pressurized by a compressor and recycled to the reaction system for reuse.

The intermediate product after flash distillation then entered a membrane separation device at a rate of 2.0 m³/h for the separation of the complex catalyst, at a membrane separation pressure of 1.0 MPa and a separation temperature of 30° C. The material used for membrane separation was a polytetrafluoroethylene membrane. The output of the membrane separation device was the intermediate product from which the complex catalyst was removed, and the bottom output was the separated complex catalyst.

The intermediate product from which the complex catalyst was removed was subjected to separation by gas stripping for 20 min at a gas stripping temperature of 80° C. and a volume ratio of 10:1 of the gas (inert gas such as nitrogen) to the intermediate product for gas stripping, so as to further remove the remaining gaseous $BF_3$ dissolved in the polymerization intermediate product. The $BF_3$ separated by gas stripping was absorbed with water at a complexation temperature of 5° C. After the gas stripping separation, a final polymerization product was obtained, with a fluorine content measured to be less than 10 ppm, and a rate of separation and recovery of boron trifluoride and its complex of more than 99%.

Example 5

In this example, separation and recovery of boron trifluoride and its complexes in an olefin polymerization reaction were carried out, which specifically comprises the following steps.

The procedure of the polymerization reaction was the same as that in Example 1.

Separation and recovery of boron trifluoride and complex thereof:

After the polymerization reaction was completed, the polymerization intermediate product containing boron trifluoride and its complex was pumped into a flash distillation tank and flash distilled at a flash distillation pressure of 30 kPa and a flash distillation temperature of 70° C. to remove the dissolved $BF_3$ gas in the polymerization intermediate product, and this portion of gaseous $BF_3$ was pressurized by a compressor and recycled to the reaction system for reuse.

The intermediate product after flash distillation then entered a membrane separation device at a rate of 1.0 m³/h for the separation of the complex catalyst, at a membrane separation pressure of 0.8 MPa and a separation temperature of 35° C. The material used for membrane separation was a polytetrafluoroethylene membrane. The output of the membrane separation device was the intermediate product from which the complex catalyst was removed, and the bottom output was the separated complex catalyst.

The intermediate product from which the complex catalyst was removed was subjected to separation by gas stripping for 30 min at a gas stripping temperature of 60° C. and a volume ratio of 30:1 of the gas (inert gas such as nitrogen) to the intermediate product for gas stripping, so as to further remove the remaining gaseous $BF_3$ dissolved in the polymerization intermediate product. The $BF_3$ separated by gas stripping was absorbed with water at a complexation temperature of −5° C. After the gas stripping separation, a final polymerization product was obtained, with a fluorine content measured to be less than 10 ppm, and a rate of separation and recovery of boron trifluoride and its complex of more than 99%.

Example 6

In this example, separation and recovery of boron trifluoride and its complexes in an olefin polymerization reaction were carried out, which specifically comprises the following steps.

The procedure of the polymerization reaction was the same as that in Example 1.

Separation and recovery of boron trifluoride and complex thereof:

After the polymerization reaction was completed, the polymerization intermediate product containing boron trifluoride and its complex was pumped into a flash distillation tank and flash distilled at a flash distillation pressure of 80 kPa and a flash distillation temperature of 50° C. to remove the dissolved $BF_3$ gas in the polymerization intermediate product, and this portion of gaseous $BF_3$ was pressurized by a compressor and recycled to the reaction system for reuse.

The intermediate product after flash distillation then entered a membrane separation device at a rate of 2.0 m³/h for the separation of the complex catalyst, at a membrane separation pressure of 0.6 MPa and a separation temperature of 40° C. The material used for membrane separation was a polytetrafluoroethylene membrane. The output of the membrane separation device was the intermediate product from which the complex catalyst was removed, and the bottom output was the separated complex catalyst.

The intermediate product from which the complex catalyst was removed was subjected to separation by gas stripping for 40 min at a gas stripping temperature of 70° C. and a volume ratio of 40:1 of the gas (inert gas such as nitrogen) to the intermediate product for gas stripping, so as to further remove the remaining gaseous $BF_3$ dissolved in the polymerization intermediate product. The $BF_3$ separated by gas stripping was absorbed with water at a complexation temperature of 10° C. After the gas stripping separation, a final polymerization product was obtained, with a fluorine content measured to be less than 10 ppm, and a rate of separation and recovery of boron trifluoride and its complex of more than 99%.

The $BF_3$ and its complexes separated and recovered in Examples 1 to 6 were recovered and used for polymerization reaction, and the reaction effects were comparable to that before recovery. The results for comparison are shown in Table 1 below.

Comparative Example 2

The procedure of the polymerization reaction was the same as that in Example 1. After the polymerization reaction was completed, the polymerization intermediate product containing boron trifluoride and its complex was pumped into a flash distillation tank and flash distilled for 40 minutes at a flash distillation pressure of 60 kPa and a flash distillation temperature of 90° C.

The intermediate product after flash distillation then entered a membrane separation device at a rate of 3.0 m³/h for the separation of the complex catalyst, at a membrane separation pressure of 0.8 MPa and a separation temperature of 35° C. The material used for membrane separation was a polyvinylidene fluoride membrane. The output of the membrane separation device was the intermediate product from which the complex catalyst was removed, and the bottom output was the separated complex catalyst. The extraction was carried out by using 2-methylundecane as an extractant at a volume ratio of 1:1, and the purified complex upon further separation could be reused.

The intermediate product from which the complex catalyst had been removed was analyzed, and the removal rate of boron trifluoride and its complex was 68%. In addition, the performance of the recovered catalyst was evaluated, and the results of the compositional analysis of the product showed a significant increase in the content of higher polymers in the product (up to 37.6% for pentamer and higher polymers) and a decrease in the yield of the target product.

Comparative Example 3

The procedure of the polymerization reaction was the same as that in Example 1.

TABLE 1

| Catalysts | Pour point (° C.) | Kinematic viscosity (mm²/s) | | Viscosity index | Mononer (wt %) | Dimer (wt %) | Trimer (wt %) | Tetramer (wt %) | Pentamer and higher (wt %) | Conversion rate (%) |
|---|---|---|---|---|---|---|---|---|---|---|
| | | 100° C. | 40° C. | | | | | | | |
| Fresh | −53 | 4.33 | 19.43 | 134 | 0.6 | 3.8 | 55.7 | 26.0 | 14 | 99.4 |
| Recovered Example 1 | −54 | 4.29 | 18.18 | 133 | 0.8 | 4.2 | 56.4 | 26.2 | 12.5 | 99.2 |
| Recovered Example 2 | −53 | 4.32 | 19.34 | 134 | 0.5 | 3.5 | 56.1 | 26.1 | 13.8 | 99.5 |
| Recovered Example 3 | −53 | 4.33 | 19.41 | 134 | 0.9 | 4.6 | 54.3 | 25.3 | 14.9 | 99.1 |
| Recovered Example 4 | −54 | 4.42 | 19.86 | 135 | 0.2 | 3.9 | 57.3 | 22.5 | 16.1 | 99.8 |
| Recovered Example 5 | −53 | 4.27 | 18.69 | 136 | 1.0 | 4.8 | 55.3 | 24.3 | 14.6 | 99.0 |
| Recovered Example 6 | −54 | 4.43 | 19.69 | 138 | 0.7 | 5.3 | 57.8 | 22.6 | 13.6 | 99.3 |

Comparative Example 1

The procedure of the polymerization reaction was the same as that in Example 1. After the polymerization reaction was completed, the polymerization intermediate product containing boron trifluoride and its complex was pumped into a flash distillation tank and flash distilled for 40 minutes at a flash distillation pressure of 60 kPa and a flash distillation temperature of 90° C. Analysis was conducted on the intermediate product, and the rate of removal of boron trifluoride and its complex is 20%.

After the polymerization reaction was completed, the polymerization intermediate product containing boron trifluoride and its complex was pumped into a flash distillation tank and flash distilled for 40 minutes at a flash distillation pressure of 60 kPa and a flash distillation temperature of 90° C.

The intermediate product after flash distillation then entered a membrane separation device at a rate of 3.0 m³/h for the separation of the complex catalyst, at a membrane separation pressure of 1.0 MPa and a separation temperature of 30° C. The material used for membrane separation was a polytetrafluoroethylene membrane. The output of the membrane separation device was the intermediate product from which the complex catalyst was removed, and the bottom output was the separated complex catalyst. The extraction was carried out by using 2-methylundecane as an extractant at a volume ratio of 1:1, and the purified complex upon further separation could be reused. The output of the polymerization device was the intermediate product from which the complex catalyst was removed, and upon analysis of the intermediate product the removal rate of boron trifluoride and its complex was 80%.

Comparative Example 4

The procedure of the polymerization reaction was the same as that in Example 1.

After the polymerization reaction was completed, the $BF_3$ complexes were separated and recovered by using a flash distillation/settling process. After flash distillation of the polymerized product, the liquid portion entered the settling equipment to obtain a complex which was recovered, while the gaseous product at the top of the flash distillation tank was absorbed by isopropanol. Through extensive process test verification, the results show that the best result of complex removal from the oil product was 58%, which still cannot meet the requirement of F content of catalyst in the subsequent hydrogenation process.

The data for comparison of the complex removal rate and the profile of the polymerization product composition obtained by recycling the catalyst in the examples and comparative examples are shown in Table 2 below.

TABLE 2

| Examples | Mononer (wt %) | Dimer (wt %) | Trimer (wt %) | Tetramer (wt %) | Pentamer and higher (wt %) | Conversion rate (%) | Complex removal rate (%) |
|---|---|---|---|---|---|---|---|
| Example 1 | 0.8 | 4.2 | 56.4 | 26.2 | 12.5 | 99.2 | >99 |
| Example 2 | 0.5 | 3.5 | 56.1 | 26.1 | 13.8 | 99.5 | >99 |
| Example 3 | 0.9 | 4.6 | 54.3 | 25.3 | 14.9 | 99.1 | >99 |
| Example 4 | 0.2 | 3.9 | 57.3 | 22.5 | 16.1 | 99.8 | >99 |
| Example 5 | 1.0 | 4.8 | 55.3 | 24.3 | 14.6 | 99.0 | >99 |
| Example 6 | 0.7 | 5.3 | 57.8 | 22.6 | 13.6 | 99.3 | >99 |
| Comparative Example 1 | | | | — | | | 20 |
| Comparative Example 2 | 1.6 | 5.3 | 25.2 | 30.3 | 37.6 | 98.4 | 68 |
| Comparative Example 3 | 1.2 | 6.3 | 38.9 | 26.4 | 27.2 | 98.8 | 80 |
| Comparative Example 4 | 1.5 | 5.9 | 36.9 | 24.9 | 31.2 | 98.8 | 58 |

By comparison, it can be seen that, as shown in the test results of Comparative Example 1, in the case of the catalyst removal from the oil product by flash distillation process only, the removal rate is only 20%, which is poor in terms of the removal efficiency. As shown in the test results of Comparative Example 2, in the case of catalyst removal from oils by flash distillation/membrane separation processes, in which the membrane separation equipment used was a self-designed membrane separation device and polyvinylidene fluoride was chosen as the membrane material, the removal rate is 68%; at the same time, the product composition profile changes drastically, with a significant increase in the number of pentamer and higher polymers. As shown in the test results of Comparative Example 3, in the case of catalyst removal from the oil product by flash distillation/membrane separation processes, in which polytetrafluoroethylene was chosen as the membrane material, the removal rate is 80%.

The above examples of the present invention are clearly only exemplification for the purpose of clearly illustrating the present invention, and are not intended to limit the embodiments of the present invention. For a person of ordinary skill in the art, other variations or changes in different forms can be made on the basis of the above description. The embodiments herein are not meant to be exhaustive, and any apparent variations or changes derived from the technical solutions of the present invention are still within the protection scope of the present invention.

The invention claimed is:

1. A method for separation and recovery of boron trifluoride and complexes thereof in an olefin polymerization reaction, comprising:
   1) subjecting a mixture obtained after an olefin polymerization reaction to flash distillation separation to separate part of gaseous boron trifluoride;
   2) subjecting a liquid phase obtained from the flash distillation separation to membrane separation to obtain complexes of boron trifluoride and a crude product of the olefin polymerization reaction; and
   3) subjecting the crude product of the olefin polymerization reaction obtained in step 2) to gas stripping separation to separate the remaining gaseous boron trifluoride, so as to obtain a pure product of the olefin polymerization reaction.

2. The method for separation and recovery according to claim 1, wherein an organic membrane of a fluorine-containing polymer is used in the membrane separation.

3. The method for separation and recovery according to claim 2, wherein the organic membrane of a fluorine-containing polymer is an organic membrane of polyvinylidene fluoride or polytetrafluoroethylene.

4. The method for separation and recovery according to claim 1, wherein the membrane separation is carried out at a separation pressure of 0.1 to 1 MPa and a separation temperature of 5 to 50° C.

5. The method for separation and recovery according to claim 1, further comprising:
   passing the gaseous boron trifluoride separated in step 1) through a gas booster to pressurize it to a desired pressure for recovery and reuse.

6. The method for separation and recovery according to claim 5, wherein the gaseous boron trifluoride is subjected to a purification treatment prior to the pressurization, wherein the purification treatment comprises cooling the gaseous boron trifluoride down to 0 to 30° C.

7. The method for separation and recovery according to claim 1, further comprising: further subjecting the complexes of boron trifluoride separated in step 2) to solvent extraction before recovery and reuse, wherein the extractant for the solvent extraction is a saturated hydrocarbon with a carbon number of 10 to 18 having an electron-donating group; and the volume ratio of the extractant to the complexes of boron trifluoride is 1:1 to 10:1.

8. The method for separation and recovery according to claim 1, further comprising: subjecting the gaseous boron trifluoride separated in step 3) to complexation and absorption by a complexing agent before reuse.

9. The method for separation and recovery according to claim 8, wherein the complexing agent is water or an alcohol-based complexing agent; and the complexation and absorption is carried out at a temperature of −10° C. to 30° C.

10. The method for separation and recovery according to claim 1, wherein the flash distillation separation is carried out at a flash distillation pressure of 1 to 101 kPa, and a flash distillation temperature of 5 to 120° C. for a flash distillation duration of 1 to 60 min.

11. The method for separation and recovery according to claim 10, wherein the gas stripping separation is carried out at a gas stripping temperature of 5 to 120° C. for a duration of 10 to 60 min, a volume ratio of the gas used for gas stripping to the crude product of the olefin polymerization reaction is 1:1 to 50:1, and a gas stripping medium is one or a combination of two or more of nitrogen, helium, argon, krypton and xenon.

* * * * *